US012473513B2

(12) United States Patent
Billiauw et al.

(10) Patent No.: US 12,473,513 B2
(45) Date of Patent: Nov. 18, 2025

(54) LIQUID HAND DISHWASHING DETERGENT COMPOSITION

(71) Applicant: The Procter & Gamble Company, Cincinnati, OH (US)

(72) Inventors: Jan Julien Marie-Louise Billiauw, Gentbrugge (BE); Mate Debreczeni, Brussels (BE); Rebecca Ann Langevin, Norwood, OH (US); Natalia Stergiopoulou, Brussels (BE); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 393 days.

(21) Appl. No.: 18/125,155

(22) Filed: Mar. 23, 2023

(65) Prior Publication Data

US 2023/0399584 A1 Dec. 14, 2023

(30) Foreign Application Priority Data

Mar. 31, 2022 (EP) .................................... 22165731
Dec. 22, 2022 (EP) .................................... 22215756

(51) Int. Cl.
*C11D 1/00* (2006.01)
*C11D 1/94* (2006.01)
*C11D 17/08* (2006.01)

(52) U.S. Cl.
CPC ................ *C11D 1/94* (2013.01); *C11D 17/08* (2013.01); *C11D 2111/14* (2024.01)

(58) Field of Classification Search
CPC ....... C11D 1/94; C11D 17/08; C11D 2111/14; C11D 17/0008; C11D 1/146; C11D 1/28; C11D 1/37
USPC .......................................................... 510/237
See application file for complete search history.

(56) References Cited

U.S. PATENT DOCUMENTS

| | | | | | |
|---|---|---|---|---|---|
| 2,673,842 | A | | 3/1954 | Brown | |
| 2,880,219 | A | | 3/1959 | Burnette et al. | |
| 3,649,543 | A | * | 3/1972 | Cahn et al. | C11D 1/126 510/237 |
| 4,554,098 | A | | 11/1985 | Klisch et al. | |
| 5,231,224 | A | | 7/1993 | Gerdau et al. | |
| 5,496,959 | A | | 3/1996 | Day | |
| 6,013,616 | A | | 1/2000 | Fabry et al. | |
| 2020/0332232 | A1 | | 10/2020 | Naqvi | |
| 2022/0081645 | A1 | * | 3/2022 | Billiauw | C11D 17/0008 |

FOREIGN PATENT DOCUMENTS

| | | | | |
|---|---|---|---|---|
| CN | 107083287 | A | | 8/2017 |
| JP | H05222395 | A | | 8/1993 |
| JP | H08302390 | A | | 11/1996 |
| JP | H1029788 | A | | 2/1998 |
| JP | 2956268 | B2 | | 4/1999 |
| JP | 3114370 | B2 | | 8/2005 |
| WO | 0238714 | A1 | | 5/2002 |
| WO | WO 2004018611 | A1 | * | 3/2004 |
| WO | WO 2004045783 | A2 | * | 6/2004 |

OTHER PUBLICATIONS

Extended EP Search Report and Search Opinion for 22215756.2 dated Jul. 25, 2022, 7 pages.

* cited by examiner

*Primary Examiner* — Eisa B Elhilo
(74) *Attorney, Agent, or Firm* — Elizabeth A. Conklin; Andrew J. Mueller

(57) ABSTRACT

A liquid hand dishwashing detergent composition having a higher fraction of components derived from natural, renewable sources is described. The liquid hand dishwashing detergent composition has a surfactant system which includes anionic surfactant having a combination of alkyl sulphate anionic surfactant and acyl taurate anionic surfactant.

20 Claims, No Drawings

LIQUID HAND DISHWASHING DETERGENT COMPOSITION

FIELD OF THE INVENTION

The invention relates to liquid hand dishwashing detergent compositions, which provide good sudsing, viscosity, and stability, while still having high biodegradability and a high level of renewable components.

BACKGROUND OF THE INVENTION

During manual dishwashing in a sink full of water into which a detergent composition has been diluted to form a cleaning liquor, and also direct application using implements such as a sponge, the user typically relies on the level of suds to indicate the remaining cleaning efficacy of the diluted detergent composition. A high suds volume and/or stable, long-lasting suds longevity (i.e., mileage) indicates to the user that sufficient active ingredients (e.g., surfactants) remain, in order to perform the desired cleaning. Poor suds longevity typically leads to the user dosing additional detergent composition even when cleaning efficacy remains.

Hand dishwashing cleaning compositions have typically been formulated using alkyl ether sulphate surfactants as the principal anionic surfactant. However, there is an increasing desire for detergent compositions which have improved biodegradability, and which are derived from renewable sources. As a result, there is a greater desire to use alkyl sulphate anionic surfactants which comprise only low levels of ethoxylation, or even being free of ethoxylation. Beyond such lowly or non-ethoxylated alkyl sulphate anionic surfactants have also been found to generally improve grease cleaning performance when compared to highly ethoxylated alkyl sulphate anionic surfactants. However, formulating with such alkyl sulphate anionic surfactants typically leads to poor low temperature stability and can have reduced suds longevity in the presence of greasy soils.

Non-alkoxylated alkyl sulphate surfactants can be formed using naturally derived alkyl chains, such as those derived from palm oil or coconut oil. It has also been found that non-alkoxylated alkyl sulphate surfactants are readily biodegradable by microorganisms in soil and natural waters. However, such naturally derived alkyl chains are typically fully linear, resulting in fully linear non-alkoxylated alkyl sulphate surfactants. Liquid detergent compositions comprising linear alkyl sulphates typically require more solvent to provide the desired low temperature phase stability and to achieve the desired viscosity profile for ease of dosing by the user. The increased solvent also results in a less environmentally sustainable composition.

Whether first added to a sink full of water or added directly to the dish to be washed or to a cleaning implement, the user expects a consistent usage and product performance experience during manual dishwashing. This includes the viscosity of the product as it directly impacts the user dosing experience, e.g. a low viscous product will flow faster out of the detergent container than a high viscous product will. As such, in order to provide a more consistent user experience, a Newtonian viscosity profile is desired. For products having a Newtonian viscosity, a more constant liquid flow out of the bottle is achieved even as the pressure applied to the bottle varies. It is also desirable to add ingredients to improve performance, such as grease cleaning and sudsing. However, such ingredients often result in substantial changes to the viscosity. This can result in a less desirable pour profile, as well as less desirable dissolution in use.

As such, there is a need for a hand dishwashing detergent composition comprising alkyl sulphate anionic surfactants which comprise only low levels of ethoxylation, or even being free of ethoxylation, while still providing the desired low-temperature stability, and sudsing profile especially in the presence of greasy soils, while also improving grease cleaning. In addition, a need remains for a hand-dishwashing composition which is highly effective at removing grease, providing long-lasting suds under soiled conditions, while not substantially changing the viscosity.

U.S. Pat. No. 2,673,842 relates to surface active agents and deals more particularly with compositions having very good lathering properties in the presence or absence of oleaginous materials. U.S. Pat. No. 2,673,842 teaches that when alkali metal or ammonium sulphates of the 2-butyloctanol-1 polyglycol ethers are mixed in varying proportions with alkali metal or ammonium salts of N-alkyltaurines in which the alkyl radical has 12 carbon atoms, the resulting mixtures exhibit a marked superiority in lathering properties over either constituent when employed alone. JP08302390 relates to detergent compositions comprising acylalkyl taurate-type anionic surfactants which are hypoallergenic and have excellent foaming properties, stability over time, and usability. JP2956268 relates to weakly acidic detergent compositions comprising acylmethyltaurine salts, used for hair shampoos, body shampoos, facial cleansers, dishwashing detergents and the like. U.S. Pat. No. 4,554,098 relates to high-foaming liquid detergent compositions which exhibit reduced detergent irritation effects when brought in contact with the skin, the compositions exhibit good foaming characteristics, in the presence of grease soil, but are milder to the skin, and are particularly suitable for use as hand dishwashing detergents, shampoos, liquid soaps and foam baths. The liquid detergent compositions can comprise N-C8-C18 acyl taurate surfactants. WO200238714 relates to detergent compositions which exhibits high foaming even in the presence of oil, has low skin irritation, and has good stability over time, the compositions comprising (a) at least one member selected from among higher fatty acid salts (a1), amido ether sulphate anionic surfactants (a2), and acyl taurate anionic surfactants (a3) and (b) a betaine-type amphoteric surfactant of undecylenamidoacetic acid and characterized in that the contents of (a) and (b) are 5 to 35 wt % and 0.5 to 20 wt % respectively and the a/b weight ratio is 3/4 to 10/1. JP3178085 relates to detergent compositions which are low-irritant, high-foaming, with elastic, creamy foam, and an appropriate viscosity, and stable over time, the compositions comprising an acylalkyltaurine salt type anionic surfactant. JP05222395 relates to mildly acidic detergent compositions which are hypoallergenic, have low temperature stability and excellent usability, which comprise an ammonium salt of an acylalkyl taurine. JP3114370 relates to detergent compositions which have low irritation, foaming properties, stability over time, and excellent usability, the compositions comprising an acylalkyl taurate type anionic surfactant. U.S. Pat. No. 6,013,616 relates to detergent mixtures with improved dermal compatibility which contain monoglyceride(ether)sulphates and selected fatty acid condensation products, to surface-active formulations containing these mixtures and to the use of the mixtures for the production of surface-active formulations, the compositions comprising fatty acid taurates. U.S. Pat. No. 3,649,543 relates to mild emulsifying agents which consist essentially of a synergistic combination of a water-soluble taurine salt and a surface-active organic sulphate or sulphonate detergent. U.S. Pat. No. 2,880,219A relates to the production of amide-type anionic surface active sulphonates, more particularly N-higher acyl taurine salts. U.S. Pat. No. 5,496,959A relates to the preparation of N-acyl taurates by the direct condensation of carboxylic acids with taurate (substituted 2-aminoalkane sulphonic acids and their alkali metal salts) derivatives. CN107083287A relates to a mechanical processing cleaning agent and its production technology, the agent comprising oleoyl methyl sodium taurocholate. U.S. Pat. No. 5,231,224A relates to alkyl ether carboxylic acid taurides, processes for their preparation and their use as surface-active substances, especially as mild cleaning agents for cosmetic purposes. US2020/332232A relates to stable, anhydrous dish soap formulation. US20220081645A1 relates to a hand-dishwashing composition for removing grease, while also having good suds mileage, and avoiding negatives on physical stability, especially at low temperatures is met by formulating the hand dishwashing composition to comprise a surfactant system, the surfactant system comprising an alkyl sulfate anionic surfactant comprising little or no branching and having a low degree of alkoxylation, or no alkoxylation, and a co-surfactant, in combination with polypropylene glycol of a defined molecular weight.

SUMMARY OF THE INVENTION

The present invention relates to a liquid hand dishwashing detergent composition comprising from 5.0% to 50% by weight of the liquid hand dishwashing detergent composition of a surfactant system, wherein the surfactant system comprises: anionic surfactant, wherein the anionic surfactant comprises: alkyl sulphate anionic surfactant, wherein the alkyl sulphate has an average degree of ethoxylation of less than 0.5 , and acyl taurate anionic surfactant as described in claim 1; wherein the composition has a pH of 7.0 or greater, measured as a 10% aqueous solution in demineralized water at 20 degrees ° C.

DETAILED DESCRIPTION OF THE INVENTION

Formulating the liquid cleaning composition as described herein, results in a hand dishwashing detergent composition having good low-temperature stability, and a desirable sudsing profile in the presence of greasy soils, while also having improved grease cleaning, while not substantially changing the viscosity profile of the composition.

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease in the material) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes initial suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high initial suds volume and/or sustained suds volume, particularly during a substantial portion of or for the entire manual dishwashing process. This is important as the consumer uses high suds as an indicator that enough cleaning composition has been dosed. Moreover, the consumer also uses the sustained suds volume as an indicator that enough active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

All percentages are by weight of the total composition, as evident by the context, unless specifically stated otherwise. All ratios are weight ratios, unless specifically stated otherwise, and all measurements are made at 25° C., unless otherwise designated.

Liquid Cleaning Composition

The cleaning composition is a liquid cleaning composition, preferably a liquid hand dishwashing cleaning composition, and hence is in liquid form. The liquid cleaning composition is preferably an aqueous cleaning composition. As such, the composition can comprise from 50% to 85%, preferably from 50% to 75%, by weight of the total composition of water.

The liquid cleaning composition has a pH of 7.0 or greater, or a pH of from 7.0 to 12.0, preferably from 7.5 to 11.0, more preferably from 8.0 to 10.0, measured as a 10% aqueous solution in demineralized water at 20 degrees ° C.

The liquid cleaning composition of the present invention can be Newtonian or non-Newtonian, preferably Newtonian. Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof.

The compositions of the present invention may comprise renewable components and exhibit good performance, such as cleaning and suds mileage. The compositions disclosed herein may comprise from 20% or from 40% or from 50%, to 60% or 80% or even to 100% by weight of the compositions of renewable components. The compositions disclosed herein may be at least partially or fully bio-based. As such, the composition can comprise a bio-based carbon content of from 50% to 100%, preferably from 75% to 100%, most preferably from 80% to 100%, most preferably about 90% to about 100% by weight of the composition. By bio-based, it is meant that the material is derived from substances derived from living organisms such as farmed plants, rather than, for example, coal-derived or petroleum-derived. The percent bio-based carbon content can be calculated as the "percent Modern Carbon (pMC)" as derived using the methodology of ASTM D6866-16. The compositions of the present disclosure may be substantially free of petroleum-derived solvents. The compositions of the present disclosure may be substantially free of surfactants or even polymers derived from petroleum-derived alcohols.

Surfactant System

The liquid cleaning composition comprises from 5.0% to 50%, preferably from 6.0% to 40%, most preferably from 15% to 35%, by weight of the total composition of a surfactant system.

Anionic Surfactant

The surfactant system comprises anionic surfactant. The anionic surfactant comprises alkyl sulphate anionic surfactant having little or no alkoxylation, and acyl taurate anionic surfactant. The alkyl sulphate anionic surfactant and the acyl taurate anionic surfactant can be present at a weight ratio of from 10:1 to 1:2, preferably from 7:1 to 1:1, and most preferably from 5:1 to 2:1. Without wishing to be bound by theory, it is believed that a mixture provides a surfactant packing which balances grease cleaning and suds mileage performance, especially in presence of greasy soils, low temperature stability and demonstrating a minimum impact on the targeted finished product viscosity.

The surfactant system can comprise at least 40%, preferably from 60% to 90%, more preferably from 65% to 85% by weight of the surfactant system of the anionic surfactant. The surfactant system is preferably free of fatty acid or salt thereof, since such fatty acids impede the generation of suds.

The anionic surfactant can comprise at least 70%, preferably at least 85%, more preferably 100% by weight of the anionic surfactant of alkyl sulphate anionic surfactant and acyl taurate anionic surfactant.

Alkyl Sulphate Anionic Surfactant

The anionic surfactant can comprise at least 25%, preferably from 30% to 90%, more preferably from 65% to 85% by weight of the anionic surfactant of alkyl sulphated anionic surfactant.

The mol average alkyl chain length of the alkyl sulphate anionic surfactant can be from 8 to 18, preferably from 10 to 14, more preferably from 12 to 14, most preferably from 12 to 13 carbon atoms, in order to provide a combination of improved grease removal and enhanced speed of cleaning.

The alkyl chain of the alkyl sulphate anionic surfactant can have a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 57/43, preferably from 60/40 to 90/10, more preferably from 60/40 to 80/20, most preferably from 60/40 to 70/30, while not compromising suds mileage in the presence of particulate soils.

The relative molar amounts of C13 and C12 alkyl chains in the alkyl sulphate anionic surfactant can be derived from the carbon chain length distribution of the anionic surfactant. The carbon chain length distribution of the alkyl chains of the alkyl sulphate anionic surfactants can be obtained from the technical data sheets from the suppliers for the surfactant or constituent alkyl alcohol. Alternatively, the chain length distribution and average molecular weight of the fatty alcohols, used to make the alkyl sulphate anionic surfactant, can also be determined by methods known in the art. Such methods include capillary gas chromatography with flame ionisation detection on medium polar capillary column, using hexane as the solvent. The chain length distribution is based on the starting alcohol and alkoxylated alcohol. As such, the alkyl sulphate anionic surfactant should be hydrolysed back to the corresponding alkyl alcohol and alkyl alkoxylated alcohol before analysis, for instance using hydrochloric acid.

The alkyl sulphate anionic surfactant can have a weight average degree of branching of at least 15%, preferably from 20% to 60%, more preferably from 30% to 50%. Compositions comprising such branched alkyl sulphate surfactants typically have improved viscosity control and low temperature stability. More preferably, the alkyl sulphate anionic surfactant has an average degree of branching of less than 15%, more preferably less than 10%, most preferably the alkyl sulphate anionic surfactant is linear. Linear alkyl chains are typically derived from renewable sources.

The alkyl sulphate anionic surfactant can comprise at least 5%, preferably at least 10%, most preferably at least 25%, by weight of the alkyl sulphate anionic surfactant, of branching on the C2 position (as measured counting carbon atoms from the sulphate group for non-alkoxylated alkyl sulphate anionic surfactants, and the counting from the alkoxy-group furthest from the sulphate group for alkoxylated alkyl sulphate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulphate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the liquid cleaning composition of organic solvent, while still having improved low temperature stability. Higher surfactant branching also provides faster initial suds generation, but typically less suds mileage.

The weight average branching, described herein, has been found to provide improved low temperature stability, initial foam generation and suds longevity.

The weight average degree of branching for an anionic surfactant mixture can be calculated using the following formula:

Weight average degree of branching (%)=[(x1*wt % branched alcohol 1 in alcohol 1+x2*wt % branched alcohol 2 in alcohol 2+ . . . )/(x1+x2+ . . . )]*100 wherein x1, x2, . . . are the weight in grams of each alcohol in the total alcohol mixture of the alcohols which were used as starting material before (alkoxylation and) sulphation to produce the alkyl (alkoxy) sulphate anionic surfactant. In the weight average degree of branching calculation, the weight of the alkyl alcohol used to form the alkyl sulphate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulphate anionic surfactant.

The alkyl sulphate surfactant can be alkoxylated or free of alkoxylation.

When alkoxylated, the alkyl sulphate anionic surfactant has an average degree of alkoxylation of less than 0.5, preferably less than 0.25, more preferably less than 0.1, with no alkoxylation being particularly preferred. When alkoxylated, ethoxylation is preferred.

As such, the alkyl sulphate surfactant comprises less than 10% preferably less than 5% by weight of the alkyl sulphate anionic surfactant of an alkoxylated alkyl sulphate surfactant, more preferably wherein the alkyl sulphate anionic surfactant is free of an alkoxylated alkyl sulphate surfactant.

The average degree of alkoxylation is the mol average degree of alkoxylation (i.e., mol average alkoxylation degree) of all the alkyl sulphate anionic surfactant. Hence, when calculating the mol average alkoxylation degree, the mols of non-alkoxylated sulphate anionic surfactant are included:

Mol average alkoxylation degree=(x1*alkoxylation degree of surfactant 1+x2*alkoxylation degree of surfactant 2+ . . . )/(x1+x2+ . . . )

wherein x1, x2, . . . are the number of moles of each alkyl (or alkoxy) sulphate anionic surfactant of the mixture and alkoxylation degree is the number of alkoxy groups in each alkyl sulphate anionic surfactant.

Preferred alkyl alkoxy sulphates are alkyl ethoxy sulphates

Suitable counterions include alkali metal cation, earth alkali metal cation, alkanolammonium or ammonium or substituted ammonium, but preferably sodium, since the use of alkanolammonium or ammonium or substituted ammonium can lead to discoloration of the composition.

Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

The performance can be affected by the width of the alkoxylation distribution of the alkoxylated alkyl sulphate anionic surfactant, including grease cleaning, sudsing, low temperature stability and viscosity of the finished product. The alkoxylation distribution, including its broadness can be varied through the selection of catalyst and process conditions when making the alkoxylated alkyl sulphate anionic surfactant.

If ethoxylated alkyl sulphate is present, without wishing to be bound by theory, through tight control of processing conditions and feedstock material compositions, both during alkoxylation especially ethoxylation and sulphation steps, the amount of 1,4-dioxane by-product within alkoxylated especially ethoxylated alkyl sulphates can be reduced. Based on recent advances in technology, a further reduction of 1,4-dioxane by-product can be achieved by subsequent stripping, distillation, evaporation, centrifugation, microwave irradiation, molecular sieving or catalytic or enzymatic degradation steps. Processes to control 1,4-dioxane content within alkoxylated/ethoxylated alkyl sulphates have been described extensively in the art. Alternatively 1,4-dioxane level control within detergent formulations has also been described in the art through addition of 1,4-dioxane inhibitors to 1,4-dioxane comprising formulations, such as 5,6-dihydro-3-(4-morpholinyl)-1-[4-(2-oxo-1-piperidinyl)-phenyl]-2-(1-H)-pyridone, 3-α-hydroxy-7-oxo stereoisomer-mixtures of cholinic acid, 3-(N-methyl amino)-L-alanine, and mixtures thereof.

The anionic surfactant can comprise additional anionic surfactant such as those selected from the group consisting of: alkyl (benzene) sulphonate surfactant, alkyl sulphosuccinate and dialkyl sulphosuccinate ester surfactants, and mixtures thereof. However, in preferred compositions, the anionic surfactant consists of alkyl sulphate anionic surfactant and acyl taurate anionic surfactant.

Acyl Taurate Anionic Surfactant

Suitable acyl taurates (or taurides) are anionic surfactants which are composed of a lipophilic tail group and a hydrophilic head group consisting of N-taurine (2-aminoethanesulphonic acid, or salt thereof) or N-alkyltaurine, the N-alkyltaurine having an alkyl group comprising 1 to 3 carbon atoms bound to the nitrogen of the 2-aminoethanesulphonic acid group. The head group is N-taurine (2-aminoethanesulphonic acid, or salt thereof). The lipophilic residue consists of an acyl chain. Preferably the lipophilic tail group consists of an acyl group formed by reacting an alkyl carboxylic acid (fatty acid) with a taurine group to form an amide bond.

The acyl taurate surfactants of use in the present invention do not comprise hydroxy groups. It is believed that such hydroxy groups result in the surfactant having an increased hydrophilicity. As such, they are less effective at forming mixed micelles with the alkyl sulphate surfactant.

Suitable lipophilic tail groups have an acyl chain. The acyl chain comprises a number average alkyl chain length of from 8 to 14, preferably from 10 to 14, more preferably from 12 to 14 carbon atoms. For such acyl chains, the carbon connected to the oxygen atom is counted in the carbon count. It is believed that when the acyl chains of the acyl taurate anionic surfactants and the alkyl chains of the alkyl sulphate anionic surfactants have similar lengths, the surfactant packing is improved. In addition, when the acyl taurate anionic surfactant has a blend of acyl chain lengths of 12 to 14 carbon atoms, low temperature stability is improved over single acyl chain lengths. As such, the lipophilic chains used to make the acyl taurate anionic surfactants preferably have a distribution of acyl chain lengths, such as 12, 13, and 14 carbon atoms, or 12 and 14 carbon atoms, with a blend of 12 and 14 carbon atoms being particularly preferred. The relative molar amounts of C14 and C12 acyl chains in the constituent lipophilic chain can be derived from the carbon chain length distribution of the starting fatty acids used. The carbon chain length distribution of the alkyl chains of the starting fatty acids can be obtained from the technical data sheets from the suppliers for the fatty acids. Alternatively, the chain length distribution and average molecular weight of the starting fatty acids, used to make the acyl taurate anionic surfactant, can also be determined by methods known in the art. Such methods include capillary gas chromatography with flame ionisation detection on medium polar capillary column, using hexane as the solvent. The chain length distribution is based on the starting fatty acid. The acyl taurate can comprise a small sub-fraction of C16 and C18 acyl chains, more particularly a mol fraction of C16 to C18 chains of from 2% to 20%. Herein the C18 chains may be saturated, unsaturated, or a mixture thereof. However, the acyl chain of the constituent lipophilic chain preferably has a mol fraction of C12 to C14 chains of at least 60%, preferably at least 70%, more preferably at least 80%, most preferably at least 90%. Preferably the molar ratio between C12 and C14 chains is from 1:1 to 6:1 preferably from 2:1 to 5:1. For acyl chains, the carbon bound to the oxygen is included in the carbon atom count.

As such, the acyl taurate anionic surfactant has the formula (I):

(I)

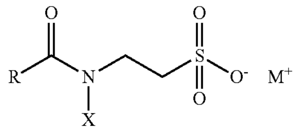

wherein:

in the lipophilic tail group, R(CO)—, R is an alkyl chain comprising a number average of from 7 to 13, preferably from 9 to 13, more preferably from 11 to 13 carbon atoms, most preferably R is a blend of C11 and C13 alkyl chains;

X is H or an alkyl chain comprising from 1 to 3 carbon atoms, preferably H or methyl, more preferably methyl;

$M^+$ is a counterion, preferably an alkali metal counterion such as a sodium or potassium ion, more preferably $Na^+$.

The acyl chain of the lipophilic chain can have an average degree of branching of less than 15%, preferably less than 10%, more preferably the acyl chain is linear. The acyl chain is preferably naturally derived from renewable feedstock such as coconut oil or palm kernel oil, with coconut oil being preferred.

Alternatively, but less preferred, the acyl taurate anionic surfactant can be branched, having a weight average degree of branching of at least 15%, preferably from 20% to 60%, more preferably from 30% to 50%.

The weight average degree of branching for the acyl taurate anionic surfactant is calculated using the same methodology as described earlier for alkyl sulphate anionic surfactants.

The weight average degree of branching and the distribution of branching can typically be obtained from the technical data sheet for the constituent fatty acid used to make the acyl taurate anionic surfactant. Alternatively, the type of branching can also be determined through analytical methods known in the art, including capillary gas chromatography with flame ionisation detection on medium polar capillary column, using hexane as the solvent.

Suitable starting fatty acids for making the acyl taurate anionic surfactant include lauric acid (C12), myristic acid (C14), and mixtures thereof. As such, Lauric acid (C12), myristic acid (C14), and especially mixtures thereof are preferred.

Suitable acyl taurate anionic surfactants are commercially available from the Innospec company under the Aquanate and Pureact tradenames, and from Clariant under the Hostapon tradename. Most preferred are Hostapon LT and Hostapon CT materials from the Clariant company.

Suitable acyl taurates of formula (I) can be formed by direct amidation of N-taurine (2-aminoethanesulphonic acid, or salt thereof) or an N-alkyltaurine having an alkyl group comprising 1 to 3 carbon atoms, with the corresponding fatty acid for 10 hours at 220° C. under nitrogen, optionally in the presence of a suitable catalyst such as sodium borohydride, boric acid or zinc oxide.

Processes for preparing acyl taurate surfactants are disclosed in U.S. Pat. Nos. 2,880,219A, 5,496,959A, and "*Reaction of Fatty Acids with N-Methyl Taurine*", (L. W. Burnette, M. E. Chiddix) J. Amer. Oil Chem. Soc., 39(11), 1962, 477-478.

Additional Anionic Surfactant

Anionic alkyl sulphonate or sulphonic acid surfactants suitable for use herein include the acid and salt forms of alkylbenzene sulphonates, alkyl ester sulphonates, primary and secondary alkane sulphonates such as paraffin sulphonates, alfa or internal olefin sulphonates, alkyl sulphonated (poly)carboxylic acids, and mixtures thereof. Suitable anionic sulphonate or sulphonic acid surfactants include: C5-C20 alkylbenzene sulphonates, more preferably C10-C16 alkylbenzene sulphonates, more preferably C11-C13 alkylbenzene sulphonates, C5-C20 alkyl ester sulphonates especially C5-C20 methyl ester sulphonates, C6-C22 primary or secondary alkane sulphonates, C5-C20 sulphonated (poly)carboxylic acids, and any mixtures thereof, but preferably C11-C13 alkylbenzene sulphonates. The aforementioned surfactants can vary widely in their 2-phenyl isomer content. Compared with sulphonation of alpha olefins, the sulphonation of internal olefins can occur at any position since the double bond is randomly positioned, which leads to the position of hydrophilic sulphonate and hydroxyl groups of IOS in the middle of the alkyl chain, resulting in a variety of twin-tailed branching structures. Alkane sulphonates include paraffin sulphonates and other secondary alkane sulphonate (such as Hostapur SAS60 from Clariant).

Alkyl sulphosuccinate and dialkyl sulphosuccinate esters are organic compounds with the formula MO3SCH(CO2R')CH2CO2R where R and R' can be H or alkyl groups, and M is a counter-ion such as sodium (Na). Alkyl sulphosuccinate and dialkyl sulphosuccinate ester surfactants can be alkoxylated or non-alkoxylated, preferably non-alkoxylated. The surfactant system may comprise further anionic surfactant. However, the composition preferably comprises less than 30%, preferably less than 15%, more preferably less than 10% by weight of the surfactant system of further anionic surfactant. Most preferably, the surfactant system comprises no further anionic surfactant, preferably no other anionic surfactant than alkyl sulphate anionic surfactant and the acyl taurate anionic surfactant.

Co-Surfactant

In order to improve surfactant packing after dilution and hence improve suds mileage, the surfactant system can comprise a co-surfactant. The co-surfactant can be selected from the group consisting of an amphoteric surfactant, a zwitterionic surfactant and mixtures thereof.

The anionic surfactant to the co-surfactant weight ratio can be from 1:1 to 8:1, preferably from 2:1 to 5:1, more preferably from 2.5:1 to 4:1.

The composition preferably comprises from 0.1% to 20%, more preferably from 0.5% to 15% and especially from 2% to 10% by weight of the cleaning composition of the co-surfactant.

The surfactant system of the cleaning composition of the present invention preferably comprises up to 50%, preferably from 10% to 40%, more preferably from 15% to 35%, by weight of the surfactant system of a co-surfactant.

The co-surfactant is preferably an amphoteric surfactant, more preferably an amine oxide surfactant.

The amine oxide surfactant can be linear or branched, though linear are preferred. Suitable linear amine oxides are typically water-soluble, and characterized by the formula R1—N(R2)(R3)O. R1 is a C8-18 alkyl, R1 is preferably is a linear alkyl chain, more preferably derived from natural, renewable resources such as coconut or palm kernel, with coconut being particularly preferred. R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are particularly preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, "mid-branched" means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein "symmetric" means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

a) from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and b) from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaines, amidazoliniumbetaines, sulphobetaine (INCI Sultaines), phosphobetaines, and mixtures thereof, and preferably meets formula (I):

$$R^1—[CO—X(CH_2)_n]_x—N^+(R^2)(R_3)—(CH_2)_m—[CH(OH)—CH_2]_y—Y^-$$

Wherein in formula (I),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue; R1 is preferably a linear alkyl chain, preferably derived from natural, renewable resources such as coconut or palm kernel, preferably coconut.

X is selected from the group consisting of: NH, NR4 wherein R4 is a C1-4 alkyl residue, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulphobetaine of formula (Ic) and the amido sulphobetaine of formula (Id):

$$R^1—N^+(CH_3)_2—CH_2COO^- \quad \text{(IIa)}$$

$$R^1—CO—NH—(CH_2)_3—N^+(CH_3)_2—CH_2COO^- \quad \text{(IIb)}$$

$$R^1—N^+(CH_3)_2—CH_2CH(OH)CH_2SO_3^- \quad \text{(IIc)}$$

$$R^1—CO—NH—(CH_2)_3—N^+(CH_3)_2—CH_2CH(OH)CH_2SO_3^- \quad \text{(IId)}$$

in which R1 has the same meaning as in formula (I). Particularly preferred are the carbobetaines [i.e. wherein Y—=COO— in formula (I)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine and/or laurylamidopropylbetaine are particularly preferred.

Nonionic Surfactant

The surfactant system can further comprise a nonionic surfactant. Suitable nonionic surfactants include alkoxylated alcohol nonionic surfactants, alkyl polyglucoside nonionic surfactants, and mixtures thereof. Where the nonionic surfactant comprises a blend of alkyl polyglucoside and alkoxylated alcohol nonionic surfactant, the nonionic surfactant can comprise the alkyl polyglucoside and alkoxylated alcohol nonionic surfactant in a mass ratio of from 10:90 to 90:10, preferably from 30:70 to 70:30, more preferably from 40:60 to 60:40.

The surfactant system of the composition of the present invention can further comprise from 1.0% to 50%, preferably from 1.25% to 25%, more preferably from 1.5% to 15%, most preferably from 1.5% to 5%, by weight of the surfactant system, of nonionic surfactant.

Alkoxylated Alcohol Nonionic Surfactant

Preferably, the alkoxylated alcohol non-ionic surfactant is a linear or branched, primary or secondary alkyl alkoxylated non-ionic surfactant, preferably an alkyl ethoxylated non-ionic surfactant, preferably comprising on average from 9 to 15, preferably from 10 to 14 carbon atoms in its alkyl chain and on average from 5 to 12, preferably from 6 to 10, most preferably from 7 to 8, units of ethylene oxide per mole of alcohol. The alkyl chain is preferably linear.

Suitable examples of commercially available alkoxylated alcohol nonionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The performance can be affected by the width of the alkoxylation distribution of the alkoxylated alcohol nonionic surfactant. The alkoxylation distribution, including its broadness can be varied through the selection of catalyst and process conditions when making the alkoxylated alcohol nonionic surfactant.

Alkyl Polyglucoside Nonionic Surfactant

Alkyl polyglucoside nonionic surfactants are typically more sudsing than other nonionic surfactants such as alkyl ethoxylated alcohols.

A combination of alkylpolyglucoside and anionic surfactant especially a mixture of alkyl sulphate and acyl taurate anionic surfactant, has been found to improve polymerized grease removal, suds mileage performance, reduced viscosity variation with changes in the surfactant and/or system, and a more sustained Newtonian rheology.

The alkyl polyglucoside surfactant can be selected from C6-C18 alkyl polyglucoside surfactant. The alkyl polyglucoside surfactant can have a number average degree of polymerization of from 0.1 to 3.0, preferably from 1.0 to 2.0, more preferably from 1.2 to 1.6. The alkyl polyglucoside surfactant can comprise a blend of short chain alkyl polyglucoside surfactant having an alkyl chain comprising 10 carbon atoms or less, and mid to long chain alkyl polyglucoside surfactant having an alkyl chain comprising greater than 10 carbon atoms to 18 carbon atoms, preferably from 12 to 14 carbon atoms. The alkyl chain is preferably linear.

Short chain alkyl polyglucoside surfactants have a monomodal chain length distribution between C8-C10, mid to long chain alkyl polyglucoside surfactants have a monomodal chain length distribution between C10-C18, while mid chain alkyl polyglucoside surfactants have a monomodal chain length distribution between C12-C14. In contrast, C8 to C18 alkyl polyglucoside surfactants typically have a monomodal distribution of alkyl chains between C8 and C18, as with C8 to C16 and the like. As such, a combination of short chain alkyl polyglucoside surfactants with mid to long chain or mid chain alkyl polyglucoside surfactants have a broader distribution of chain lengths, or even a bimodal distribution, than non-blended C8 to C18 alkyl polyglucoside surfactants. Preferably, the weight ratio of short chain alkyl polyglucoside surfactant to long chain alkyl polyglucoside surfactant is from 1:1 to 10:1, preferably from 1.5:1 to 5:1, more preferably from 2:1 to 4:1. It has been found that a blend of such short chain alkyl polyglucoside surfactant and long chain alkyl polyglucoside surfactant results in faster dissolution of the detergent solution in water and improved initial sudsing, in combination with improved suds stability.

C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation). Glucopon® 215UP is a preferred short chain APG surfactant. Glucopon® 600CSUP is a preferred mid to long chain APG surfactant.

In preferred compositions, the surfactant system can comprise an alkyl sulphate anionic surfactant and an acyl taurate anionic surfactant having an average degree of branching of less than 10%, and alkyl polyglucoside nonionic surfactant.

Further Ingredients

The cleaning composition may optionally comprise a number of other adjunct ingredients such as builders (preferably citrate), chelants, conditioning polymers, other cleaning polymers, surface modifying polymers, structurants, emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Preferred further ingredients include those selected from: amphiphilic alkoxylated polyalkyleneimines, cyclic polyamines, triblock copolymers, hydroxypropylcellulose polymers, salt, hydrotropes, organic solvents, and mixtures thereof.

Amphiphilic Alkoxylated Polyalkyleneimine

The composition of the present invention may further comprise from 0.05% to 2%, preferably from 0.07% to 1% by weight of the total composition of an amphiphilic polymer. Suitable amphiphilic polymers can be selected from the group consisting of: amphiphilic alkoxylated polyalkyleneimine and mixtures thereof. The amphiphilic alkoxylated polyalkyleneimine polymer has been found to reduce gel formation on the hard surfaces to be cleaned when the liquid composition is added directly to a cleaning implement (such as a sponge) before cleaning and consequently brought in contact with heavily greased surfaces, especially when the cleaning implement comprises a low amount to nil water such as when light pre-wetted sponges are used.

A preferred amphiphilic alkoxylated polyethyleneimine polymer has the general structure of formula (I):

The amphiphilic alkoxylated polyethyleneimine polymers can be made by the methods described in more detail in PCT Publication No. WO 2007/135645.

Alternatively, the compositions can be free of amphiphilic polymers.

Cyclic Polyamine

The composition can comprise a cyclic polyamine having amine functionalities that helps cleaning. The composition of the invention preferably comprises from 0.1% to 3%, more preferably from 0.2% to 2%, and especially from 0.5% to 1%, by weight of the total composition, of the cyclic polyamine.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

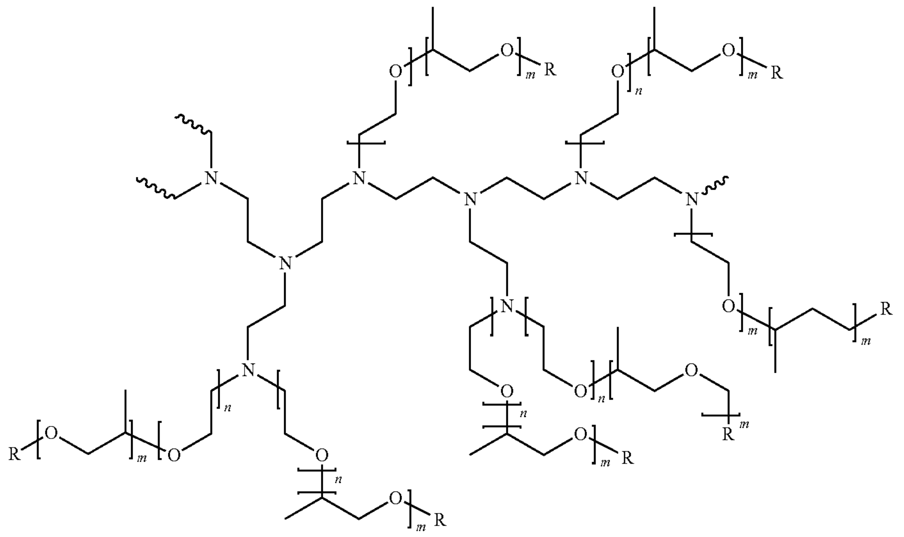

(I)

wherein the polyethyleneimine backbone has a weight average molecular weight of 600, n of formula (I) has an average of 10, m of formula (I) has an average of 7 and R of formula (I) is selected from hydrogen, a $C_1$-$C_4$ alkyl and mixtures thereof, preferably hydrogen. The degree of permanent quaternization of formula (I) may be from 0% to 22% of the polyethyleneimine backbone nitrogen atoms. The molecular weight of this amphiphilic alkoxylated polyethyleneimine polymer preferably is between 10,000 and 15,000 Da.

More preferably, the amphiphilic alkoxylated polyethyleneimine polymer has the general structure of formula (I) but wherein the polyethyleneimine backbone has a weight average molecular weight of 600 Da, n of Formula (I) has an average of 24, m of Formula (I) has an average of 16 and R of Formula (I) is selected from hydrogen, a $C_1$-$C_4$ alkyl and mixtures thereof, preferably hydrogen. The degree of permanent quaternization of Formula (I) may be from 0% to 22% of the polyethyleneimine backbone nitrogen atoms and is preferably 0%. The molecular weight of this amphiphilic alkoxylated polyethyleneimine polymer preferably is between 25,000 and 30,000, most preferably 28,000 Da.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Suitable cyclic polyamines can be supplied by BASF, under the Baxxodur tradename, with Baxxodur ECX-210 being particularly preferred.

A combination of the cyclic polyamine and magnesium sulphate is particularly preferred. As such, the composition can further comprise magnesium sulphate at a level of from 0.001% to 2.0%, preferably from 0.005% to 1.0%, more preferably from 0.01% to 0.5% by weight of the composition.

Triblock Copolymer

The composition of the invention can comprise a triblock copolymer. The triblock co-polymers can be present at a level of from 1% to 20%, preferably from 3% to 15%, more preferably from 5% to 12%, by weight of the total composition. Suitable triblock copolymers include alkylene oxide triblock co-polymers, defined as a triblock co-polymer having alkylene oxide moieties according to Formula (I): (EO)x(PO)y(EO)x, wherein EO represents ethylene oxide, and each x represents the number of EO units within the EO block. Each x can independently be on average of from 5 to 50, preferably from 10 to 40, more preferably from 10 to 30. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y can on average be from between 28 to 60, preferably from 30 to 55, more preferably from 30 to 48.

Preferably the triblock co-polymer has a ratio of y to each x of from 3:1 to 2:1. The triblock co-polymer preferably has a ratio of y to the average x of 2 EO blocks of from 3:1 to 2:1. Preferably the triblock co-polymer has an average weight percentage of total E-O of between 30% and 50% by weight of the tri-block co-polymer. Preferably the triblock co-polymer has an average weight percentage of total PO of between 50% and 70% by weight of the triblock co-polymer. It is understood that the average total weight % of EO and PO for the triblock co-polymer adds up to 100%. The triblock co-polymer can have an average molecular weight of between 2060 and 7880, preferably between 2620 and 6710, more preferably between 2620 and 5430, most preferably between 2800 and 4700. Average molecular weight is determined using a 1H NMR spectroscopy (see Thermo scientific application note No. AN52907).

Triblock co-polymers have the basic structure ABA, wherein A and B are different homopolymeric and/or monomeric units. In this case A is ethylene oxide (EO) and B is propylene oxide (PO). Those skilled in the art will recognize the phrase "block copolymers" is synonymous with this definition of "block polymers".

Triblock co-polymers according to Formula (I) with the specific EO/PO/EO arrangement and respective homopolymeric lengths have been found to enhances suds mileage performance of the liquid hand dishwashing detergent composition in the presence of greasy soils and/or suds consistency throughout dilution in the wash process.

Suitable EO-PO-EO triblock co-polymers are commercially available from BASF such as Pluronic® PE series, and from the Dow Chemical Company such as Tergitol™ L series. Particularly preferred triblock co-polymer from BASF are sold under the tradenames Pluronic® PE6400 (MW ca 2900, ca 40 wt % EO) and Pluronic® PE 9400 (MW ca 4600, 40 wt % EO). Particularly preferred triblock co-polymer from the Dow Chemical Company is sold under the tradename Tergitol™ L64 (MW ca 2700, ca 40 wt % EO).

Preferred triblock co-polymers are readily biodegradable under aerobic conditions.

Salt

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulphate, and mixtures thereof. Sodium chloride is most preferred.

Hydrotrope

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulphonate.

Organic Solvent

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol, with polypropyleneglycols having a weight average molecular weight of from 750 Da to 1,400 Da being particularly preferred.

Packaged Product

The hand dishwashing detergent composition can be packaged in a container, typically plastic containers. Suitable containers comprise an orifice. Typically, the container comprises a cap, with the orifice typically comprised on the cap. The cap can comprise a spout, with the orifice at the exit of the spout. The spout can have a length of from 0.5 mm to 10 mm.

The orifice can have an open cross-sectional surface area at the exit of from 3 $mm^2$ to 20 $mm^2$, preferably from 3.8 $mm^2$ to 12 $mm^2$, more preferably from 5 mm 2 to 10 $mm^2$, wherein the container further comprises the composition according to the invention. The cross-sectional surface area is measured perpendicular to the liquid exit from the container (that is, perpendicular to the liquid flow during dispensing).

The container can typically comprise from 200 ml to 5,000 ml, preferably from 350 ml to 2000 ml, more preferably from 400 ml to 1,000 ml of the liquid hand dishwashing detergent composition.

Alternatively, the hand dishwashing detergent composition can be packaged in an inverted container. Such inverted containers typically comprise a cap at the bottom of the container, the cap comprising either a closure or a self-sealing valve, or a combination thereof. The cap preferably comprises a self-sealing valve. Suitable self-sealing valves include slit-valves. The self-sealing valve defines a dispensing orifice that is reactively openable when the pressure on the valve interior side exceeds the pressure on the valve exterior side. The bottom dispensing container can comprise an impact resistance system, such as that described in WO2019108293A1.

Method of Washing

The invention is further directed to a method of manually washing dishware with the composition of the present invention. The method comprises the steps of delivering a composition of the present invention to a volume of water to form a wash solution and immersing the dishware in the solution. The dishware is be cleaned with the composition in the presence of water.

Optionally, the dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

Alternatively, the composition herein can be applied in its neat form to the dish to be treated. By "in its neat form", it is meant herein that said composition is applied directly onto the surface to be treated, or onto a cleaning device or implement such as a brush, a sponge, a nonwoven material, or a woven material, without undergoing any significant dilution by the user (immediately) prior to application. "In its neat form", also includes slight dilutions, for instance, arising from the presence of water on the cleaning device, or the addition of water by the consumer to remove the remaining quantities of the composition from a bottle. Therefore, the composition in its neat form includes mixtures having the composition and water at ratios ranging from 50:50 to 100:0, preferably 70:30 to 100:0, more preferably 80:20 to 100:0, even more preferably 90:10 to 100:0 depending on the user habits and the cleaning task.

Another aspect of the present invention is directed to use of the liquid hand dishwashing cleaning compositions, described herein, for providing good sudsing profile, including suds stabilization in the presence of greasy soils, and good cleaning while providing good low temperature stability, at an increased bioderived surfactant content and biodegradability profile. .

Methods

A) Viscosity Measurement

The viscosity is measured using a controlled stress rheometer (such as an HAAKE MARS from Thermo Scientific, or equivalent), using a 60 mm 1° cone and a gap size of 52 microns at 20° C. After temperature equilibration for 2 minutes, the sample is sheared at a shear rate of 10 $s^{-1}$ for 30 seconds. The reported viscosity of the liquid hand dishwashing detergent compositions is defined as the average shear stress between 15 seconds and 30 seconds shearing divided by the applied shear rate of 10 $s^{-1}$ at 20° C.

B) Suds Mileage

The objective of the Suds Mileage Test is to compare the evolution over time of suds volume generated for different test formulations at specified water hardness, solution temperatures and formulation concentrations, while under the influence of periodic soil injections. Data are compared and expressed versus a reference composition as a suds mileage index (reference composition has suds mileage index of 100). The steps of the method are as follows:

1. 0.12 wt % of the test composition is dispensed through a plastic pipette at a flow rate of 0.67 mL/sec at a height of 37 cm above the bottom surface of a sink (dimension: 300 mm diameter and 288 mm height) into a water stream having a water hardness of 2.67 mmol/L equivalence of Ca (7.28 gpg) and water temperature of 42° C., that is filling up the sink to 4 L at a constant pressure of 4 bar.
2. An initial suds volume generated (measured as average foam volume X above the liquid in the sink (expressed in $cm^3$) is recorded immediately after end of filling.
3. A fixed amount (6 mL) of a soil with one of the defined compositions below is immediately injected into the middle of the sink.
4. The resultant solution is mixed with a metal blade (10 cm×5 cm) positioned in the middle of the sink at the air liquid interface under an angle of 45° rotating at 85 RPM for 20 revolutions.
5. Another measurement of the total suds volume is recorded immediately after end of blade rotation.
6. Steps 3-5 are repeated until the measured total suds volume reaches a level of 400 $cm^3$ or less. The amount of added soil that is needed to get to the 400 $cm^3$ level is considered as the suds mileage for the test composition.
7. Each test composition is tested 4 times per testing condition (i.e., water temperature, composition concentration, water hardness, soil type).
8. The average suds mileage is calculated as the average of the 4 replicates for each sample for a defined test condition.
9. The Suds Mileage Index is calculated by comparing the average mileage of a test composition sample versus a reference composition sample. The calculation is as follows:

$$\text{Suds Mileage Index} = \frac{\text{Average number of soil additions of test composition}}{\text{Average number of soil additions of reference composition}} \times 100$$

The greasy soil composition used in the test is produced through standard mixing of the components described in Table 1.

TABLE 1

| Greasy Soil | |
|---|---|
| Ingredient | Weight % |
| Crisco Oil | 12.730 |
| Crisco shortening | 27.752 |
| Lard | 7.638 |
| Refined Rendered Edible Beef Tallow | 51.684 |
| Oleic Acid, 90% (Techn) | 0.139 |
| Palmitic Acid, 99 + % | 0.036 |
| Stearic Acid, 99 + % | 0.021 |

C) Accelerated Low Temperature Stability Test

The objective of the dynamic low temperature stability test is to get an accelerated read on the overall physical stability profile of a detergent composition at decreased temperatures. Each product is placed in a 30ml glass vial (serum type reaction vials, such as supplied by Supelco, USA) along with a magnetic stirrer bar (Neodymium or Samarium-Cobalt type), sealed airtight then placed on a magnetic stirrer in a controlled temperature chamber set at 0° C. The stirrer speed is set to 60 RPM. A camera is set to take pictures every 15 minutes for 72 hours. The outcome of the test is a time-to-failure, assessed visually. No failure within 24 hours indicates no risk for product instability at low temperature. Cloudiness and/or crystallization and/or phase split between 4 and 24 hours indicates low risk for product instability at low temperature. Failure, as described above, occurring in less than 4 hours indicates high risk for product instability at low temperatures.

EXAMPLES

The suds mileage performance, visco-sensitivity, and low temperature stability were evaluated for compositions of the present invention and comparative compositions.

1) Suds Mileage Performance and Viscosity of Inventive And Comparative Compositions Comprising Branched Alkyl (Ethoxylated) Sulphate Anionic Surfactant The following inventive and comparative liquid hand dishwashing detergent compositions were prepared by mixing together of the individual raw materials at room temperature using a batch type process.

The composition of example 1 of the present invention comprised branched alkyl sulphate anionic surfactant and linear acyl taurate anionic surfactant. The composition of comparative example A comprised the same amount of total anionic surfactant, but no acyl taurate anionic surfactant.

The composition of comparative example B was similar to inventive example 1, except it comprised alkyl ethoxylated E02.0 sulphate anionic surfactant instead of alkyl sulphate anionic surfactant. The alkyl ethoxylated E02.0 sulphate anionic surfactant was prepared by blending alkyl sulphate (E00) anionic surfactant with alkyl ethoxylated E03.0 sulphate anionic surfactant at the appropriate ratio. Comparative example C was similar to example B, except that 2.0 wt % of the acyl taurate anionic surfactant was replaced by the alkyl ethoxylated E02.0 sulphate anionic surfactant.

The composition of comparative example D was similar to inventive example 1, except that it comprised alkyl ethoxylated E03.0 sulphate anionic surfactant instead of alkyl sulphate anionic surfactant. Comparative example E was similar to example D, except that 2.0 wt % of the acyl taurate anionic surfactant was replaced by the alkyl ethoxylated E03.0 sulphate anionic surfactant.

The suds mileage of the acyl taurate comprising composition was compared to the suds mileage of the nil acyl taurate comparative composition comprising the same alkyl (ethoxylated) sulphate surfactant (reference 100). Comparing the suds mileage in the presence of greasy soil from inventive example 1 to that from comparative example A, it can be seen that the replacement of even a small amount of the alkyl sulphate anionic surfactant by the acyl taurate anionic surfactant results in an improvement in the suds mileage in comparison to the comparative composition which comprised the same level of total anionic surfactant, but no acyl taurate surfactant.

As can be seen from table 2, comparing the suds mileage of comparative composition B to that of comparative composition C, and comparative composition D to that of comparative composition E, the improvement in suds mileage from the acyl taurate anionic surfactant is not evident when an alkyl ethoxylated sulphate having a degree of ethoxylation of greater than 0.5 is used in the composition (instead of an alkyl sulphate anionic surfactant having a degree of ethoxylation less than 0.5).

In addition, with compositions comprising an alkyl sulphate anionic surfactant having less than 0.5EO, the viscosity is only marginally reduced with the addition of the acyl taurate anionic surfactant. In contrast, with compositions comprising an alkyl sulphate anionic surfactant ethoxylated to a degree greater than 0.5EO, the viscosity is more substantially reduced with the addition of the acyl taurate anionic surfactant.

TABLE 2

Suds mileage performance in the presence of greasy soil for inventive compositions and comparative compositions comprising branched alkyl (ethoxylated) sulphate anionic surfactant:

| | Ex 1 | Ex A* | Ex B* | Ex C* | Ex D* | Ex E* |
|---|---|---|---|---|---|---|
| C12-C13 branched alkyl sulphate[1] | 12.7 | 14.7 | — | — | 5.8 | 6.7 |
| C12-C13 branched alkyl ethoxylated (EO 2.0) sulphate[2] | — | — | 12.7 | 14.7 | — | — |
| C12-C13 branched alkyl ethoxylated (EO 3.0) sulphate[3] | — | — | — | — | 12.7 | 14.7 |
| C12-14 dimethyl amine oxide[4] | 5.3 | 5.3 | 5.3 | 5.3 | 5.3 | 5.3 |
| C12-14 N-methyl-taurate[5] | 2.0 | — | 2.0 | — | 2.0 | — |

TABLE 2-continued

Suds mileage performance in the presence of greasy soil for inventive compositions and comparative compositions comprising branched alkyl (ethoxylated) sulphate anionic surfactant:

| | Ex 1 | Ex A* | Ex B* | Ex C* | Ex D* | Ex E* |
|---|---|---|---|---|---|---|
| NaCl | 0.5 | 0.5 | 0.5 | 0.5 | 0.5 | 0.5 |
| Alkoxylated Polyethyleneimine[6] | 0.1 | 0.1 | 0.1 | 0.1 | 0.1 | 0.1 |
| Water + misc.[7] | to 100% | to 100% | to 100% | to 100% | to 100% | to 100% |
| Trimmed to pH (10% aqueous solution at 20° C., using NaOH/HCl)) | to 9.0 | to 9.0 | to 9.0 | to 9.0 | to 9.0 | to 9.0 |
| Suds mileage (greasy soil) | 104 | 100 | 96 | 100 | 90 | 100 |
| Viscosity mPa · s | 1919 (−8%) | 2088 | 3845 (−29%) | 5399 | 964 (−52%) | 1989 |

*Comparative

[1]C12-C13 branched alkyl sulphate anionic surfactant (54% branching), supplied by Procter & Gamble and derived from Lial ® 123 alkyl alcohol supplied by Sasol

[2]made by blending C12-C13 branched alkyl sulphate anionic surfactant (54% branching, used in line above) with C12-C13 AE3.0S, branched ethoxylated (EO 3.0) alkyl sulphate anionic surfactant (54% branching, used in line below)

[3]C12-C13 AE3.0S, branched ethoxylated (EO 3.0) alkyl sulphate anionic surfactant (54% branching), supplied by Procter & Gamble and derived from Lialet ® 123-3 ethoxylated alkyl alcohol supplied by Sasol

[4]supplied by Procter & Gamble

[5]Linear C12-14 N-methyl-taurate sold under Hostapon ® LT, supplied by Clariant

[6]Polyethyleneimine with PEI backbone MW of 600 and 24EO and 16PO units per alkoxylation chain, supplied by BASF

[7]Perfume, dye, preservative

2) Viscosity of Inventive and Comparative Compositions Comprising Linear Alkyl (Ethoxylated) Sulphate Anionic Surfactant The following inventive and comparative liquid hand dishwashing detergent compositions were prepared by mixing together of the individual raw materials at room temperature using a batch type process.

The composition of example 2 of the present invention comprised linear alkyl sulphate anionic surfactant and acyl taurate anionic surfactant. The composition of comparative example F comprised the same amount of total anionic surfactant, but no acyl taurate anionic surfactant. The composition of comparative example G was similar to inventive example 2, except it comprised linear alkyl ethoxylated EO2.0 sulphate anionic surfactant instead of linear alkyl sulphate anionic surfactant. The alkyl ethoxylated EO2.0 sulphate anionic surfactant was prepared by blending linear alkyl sulphate (EO0) anionic surfactant with linear alkyl ethoxylated E03.0 sulphate anionic surfactant at the appropriate ratio. Comparative example H was similar to example G, except that 2.0 wt % of the acyl taurate anionic surfactant was replaced by the alkyl ethoxylated EO2.0 sulphate anionic surfactant.

The composition of comparative example I was similar to inventive example 2, except that it comprised alkyl ethoxylated EO3.0 sulphate anionic surfactant instead of alkyl sulphate anionic surfactant. Comparative example J was similar to example I, except that 2.0 wt % of the acyl taurate anionic surfactant was replaced by the alkyl ethoxylated EO3.0 sulphate anionic surfactant.

As can be seen from the table below, for compositions comprising an alkyl sulphate anionic surfactant having less than 0.5EO, the viscosity is only marginally increased with the addition of the acyl taurate anionic surfactant. In contrast, with compositions comprising an alkyl sulphate anionic surfactant ethoxylated to a degree greater than 0.5EO, the viscosity is more substantially decreased with the addition of the acyl taurate anionic surfactant.

TABLE 3

Composition viscosity of inventive and comparative compositions comprising linear alkyl (ethoxylated) sulphate surfactants

| | Ex 2 | Ex F* | Ex G* | Ex H* | Ex I* | Ex J* |
|---|---|---|---|---|---|---|
| C12-C14 linear alkyl sulphate[8] | 12.7 | 14.7 | — | — | 5.8 | 6.7 |
| C12-C14 linear alkyl ethoxylated (EO 2.0) sulphate[9] | — | — | 12.7 | 14.7 | — | — |
| C12-C14 linear alkyl ethoxylated (EO 3.0) sulphate[10] | — | — | — | — | 12.7 | 14.7 |
| C12-14 dimethyl amine oxide[4] | 5.3 | 5.3 | 5.3 | 5.3 | 5.3 | 5.3 |
| C12-14 N-methyl-taurate[5] | 2.0 | — | 2.0 | — | 2.0 | — |
| NaCl | — | — | — | — | — | — |
| Water + misc.[7] | to 100% | to 100% | to 100% | to 100% | to 100% | to 100% |

TABLE 3-continued

Composition viscosity of inventive and comparative compositions comprising linear alkyl (ethoxylated) sulphate surfactants

| | Ex 2 | Ex F* | Ex G* | Ex H* | Ex I* | Ex J* |
|---|---|---|---|---|---|---|
| Trimmed to pH (10% aqueous solution at 20° C., using NaOH/HCl)) | to 9.0 | to 9.0 | to 9.0 | to 9.0 | to 9.0 | to 9.0 |
| Viscosity mPa · s** | 13019 (+12%) | 11646 | 2387 (−28%) | 3334 | 122 (−52%) | 254 |

**To note, in Table 4 the solvent system was kept constant across the legs to enable single variable comparison. While the viscosity of example 2 and example F are high for liquid hand dishwashing formulations, the viscosity can be trimmed back down to traditional viscosity ranges through techniques commonly known by a skilled person in the art, such as through the addition of organic solvents such as ethanol. For example, the addition of 4% of ethanol to example F yielded a viscosity of 2731 mPa · s.

[8]C12-C14 linear alkyl sulphate anionic surfactant, supplied by Procter & Gamble and derived from alkyl alcohol supplied by Procter & Gamble

[9]made by blending C12-C14 linear alkyl sulphate anionic surfactant with linear C12-C14 AE3.0S, ethoxylated (EO 3.0) alkyl sulphate anionic surfactant, both supplied by Procter & Gamble and derived from alkyl alcohol supplied by Procter & Gamble

[10]C12-C14 AE3.0S, linear ethoxylated (EO 3.0) alkyl sulphate anionic surfactant, supplied by Procter & Gamble and derived from alkyl alcohol supplied by Procter & Gamble

3) Accelerated Low Temperature Stability Performance

The following inventive and comparative liquid hand dishwashing detergent compositions were prepared by mixing together of the individual raw materials at room temperature using a batch type process.

Comparative composition K comprised 23.6% of branched and linear alkyl sulphate surfactant, in addition to amine oxide surfactant. Inventive composition 3 comprised essentially the same amount of anionic surfactant, but with equal parts of the linear and branched alkyl sulphate surfactant replaced with coco-derived acyl taurate surfactant. Inventive composition 4 was similar to inventive composition 3, except that a lauryl-derived acyl taurate surfactant was used, which had a narrower distribution of alkyl chains (see table 5).

As can be seen from table 4, the compositions comprising acyl taurate anionic surfactant exhibit improved low temperature stability, with the improvement in low temperature stability being more pronounced when the acyl taurate anionic surfactant has a broader alkyl chain distribution. In table 4 below, the starting fatty acid for the lauroyl-derived C12-14 N-methyl-taurate is essentially a fractionated part of the fatty acid used for the cocoyl-derived C12-14 N-methyl-taurate. Hence it had a narrower chain-length distribution.

TABLE 4 low temperature stability of a comparative composition and inventive compositions

| | Ex K | Ex 3 | Ex 4 |
|---|---|---|---|
| NaCl | 0.7 | 0.7 | 0.7 |
| Polypropylene glycol (MW2000) | 0.4 | 0.4 | 0.4 |
| Ethanol | 2.2 | 2.2 | 2.2 |
| Alkoxylated Polyethyleneimine[11] | 0.5 | 0.5 | 0.5 |
| C12-C13 branched alkyl sulphate[12] | 11.8 | 8.2 | 8.2 |
| C13 linear alkyl sulphate[13] | 11.8 | 8.2 | 8.2 |
| C12-14 Dimethyl Amine Oxide | 6.4 | 6.4 | 6.4 |
| C12-14 N-methyl-taurate (cocoyl)[14] | 0 | 7.1 | 0 |
| C12-14 N-methyl-taurate (lauroyl)[5] | 0 | 0 | 7.1 |

TABLE 4-continued low temperature stability of a comparative composition and inventive compositions

| | Ex K | Ex 3 | Ex 4 |
|---|---|---|---|
| MIT preservative | 0.0035 | 0.0035 | 0.0035 |
| Phenoxyethanol | 0.08 | 0.08 | 0.08 |
| Blue dye | 0.00163 | 0.00163 | 0.00163 |
| Perfume | 0.4 | 0.4 | 0.4 |
| Water | Balance to 100 | balance to 100 | Balance to 100 |
| pH (10% aqueous solution at 20° C. - through NaOH/HCl)) | trimmed to 9.0 | trimmed to 9.0 | trimmed to 9.0 |
| failure at 0° C. (hours) | 1 | 14 | 9 |

[11]Polyethyleneimine with PEI backbone MW of 600 and 24EO and 16PO units per alkoxylation chain, supplied by BASF

[12]Safol ® 23, supplied by Sasol

[13]Neodol ® 3, supplied by Shell

[14]Linear C12-14 N-methyl-taurate sold under Hostapon ® CT, supplied by Clariant

TABLE 5 carbon chain length distribution of different acyl taurate products

| Acyl taurate | C12 | C14 | C16 | C18 | C18:1 |
|---|---|---|---|---|---|
| Hostapon CT | 68 | 15 | 8.1 | 1.5 | 7.3 |
| Hostapon LT | 72.5 | 22.5 | 3.8 | 0 | 1 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing detergent composition comprising from about 5.0% to about 50% by weight of the liquid hand dishwashing detergent composition of a surfactant system, wherein the surfactant system comprises:

anionic surfactant, wherein the anionic surfactant comprises:

i. alkyl sulphate anionic surfactant, wherein the alkyl sulphate has an average degree of ethoxylation of less than about 0.5, and ii. acyl taurate anionic surfactant, wherein the acyl taurate anionic surfactant has the formula (I):

(I)

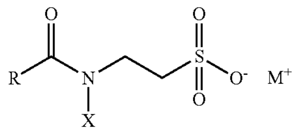

wherein:

in the lipophilic tail group, R(CO)—, R is an alkyl chain comprising a number average of from about 7 to about 13;

X is H or an alkyl chain comprising from 1 to 3 carbon atoms; and $M^+$ is a counterion;

wherein the composition has a pH of about 7.0 or greater, measured as an about 10% aqueous solution in demineralized water at about 20° C.

2. The composition according to claim 1, wherein the composition comprises from about 6.0% to about 40% by weight of the total composition of the surfactant system.

3. The composition according to claim 1, wherein the surfactant system comprises at least about 40% by weight of the surfactant system of the anionic surfactant.

4. The composition according to claim 1, wherein the anionic surfactant comprises at least about 70% by weight of the anionic surfactant of alkyl sulphate anionic surfactant and acyl taurate anionic surfactant.

5. The composition according to claim 1, wherein the acyl taurate anionic surfactant has the formula (I), wherein:

in the lipophilic tail group, R(CO)—, R is an alkyl chain comprising a number average of from 9 to 13 carbon atoms;

X is H or methyl;

$M^+$ is a counterion, which is an alkali metal counterion.

6. The composition according to claim 5, wherein the acyl taurate anionic surfactant has the formula (I), wherein: in the lipophilic tail group, R(CO)—, R is an alkyl chain comprising a number average of from 11 to 13 carbon atoms.

7. The composition according to claim 6, wherein in the acyl taurate anionic surfactant, the alkyl chain R has a mol fraction of C11 to C13 chains to total alkyl chains of at least about 60%.

8. The composition according to claim 1, wherein the alkyl sulphate anionic surfactant has a number average alkyl chain length of from 8 to 18 carbon atoms.

9. The composition according to claim 8, wherein the alkyl sulphate anionic surfactant has a number average alkyl chain length of from 12 to 14 carbon atoms.

10. The composition according to claim 1, wherein the alkyl sulphate anionic surfactant has an average degree of alkoxylation of less than about 0.25.

11. The composition according to claim 8, wherein the alkyl sulphate anionic surfactant is free of alkoxylation.

12. The composition according to claim 1, wherein the alkyl sulphate anionic surfactant has an average degree of branching of at least about 15%.

13. The composition according to claim 1, wherein the anionic surfactant comprises at least about 25% by weight of the anionic surfactant of alkyl sulphated anionic surfactant.

14. The composition according to claim 1, wherein the alkyl sulphate anionic surfactant and the acyl taurate anionic surfactant are present at a weight ratio of from about 10:1 to about 1:2.

15. The composition according to claim 1, wherein the surfactant system further comprises a co-surfactant selected from the group consisting of: amphoteric co-surfactant, zwitterionic co-surfactant, and mixtures thereof.

16. The composition according to claim 1, wherein the anionic surfactant and the co-surfactant are present in a weight ratio of from about 1:1 to about 8:1.

17. The composition according to claim 15, wherein the co-surfactant is an amphoteric surfactant which is an amine oxide surfactant.

18. The composition according to claim 17, wherein the amphoteric surfactant is an amine oxide surfactant which is selected from the group consisting of: alkyl dimethyl amine oxide, alkyl amido propyl dimethyl amine oxide, and mixtures thereof.

19. The composition according to claim 15, wherein the co-surfactant is a zwitterionic surfactant which is a betaine surfactant.

20. The composition according to claim 19, wherein the zwitterionic surfactant is a betaine surfactant which is selected from the group consisting of alkyl betaines, alkylamidoalkylbetaine, amidazoliniumbetaine, sulphobetaine (INCI Sultaines), phosphobetaine, and mixtures thereof.

* * * * *